United States Patent [19]
de Wit et al.

[11] Patent Number: 5,395,910
[45] Date of Patent: Mar. 7, 1995

[54] LIQUID-CRYSTALLINE POLYURETHANES, COMPOSITIONS OF SAID LIQUID-CRYSTALLINE POLYURETHANES, AND A DEVICE FOR OPTICAL DATA STORAGE COMPRISING A LIQUID-CRYSTALLINE POLYURETHANE

[75] Inventors: Paulus P. de Wit, Westervoort; Erwin W. P. Erdhuisen; Johan B. Reesink, both of Duiven, all of Netherlands

[73] Assignee: Akzo Nobel N.V., Arnhem, Netherlands

[21] Appl. No.: 998,698

[22] Filed: Dec. 30, 1992

[30] Foreign Application Priority Data

Dec. 30, 1991 [NL] Netherlands .......................... 9102191

[51] Int. Cl.$^6$ ............................................. C08G 18/30
[52] U.S. Cl. ........................................ 528/80; 528/85; 428/1; 430/20; 252/299.01; 252/299.66; 252/299.67; 252/299.68
[58] Field of Search ...................... 528/85, 80; 428/1; 430/20; 252/299.01, 299.66, 299.67, 299.68

[56] References Cited

U.S. PATENT DOCUMENTS

| | | | |
|---|---|---|---|
| 4,762,901 | 8/1988 | Dhein et al. | 528/73 |
| 4,865,406 | 9/1989 | Khanarian et al. | 350/96.12 |
| 4,959,448 | 9/1990 | Wreesmann et al. | 528/192 |
| 4,971,416 | 11/1990 | Khanarian et al. | 350/96.12 |
| 5,001,209 | 3/1991 | Wreesmann et al. | 528/70 |
| 5,075,409 | 12/1991 | Barthelemy et al. | 528/85 |

FOREIGN PATENT DOCUMENTS

| | | |
|---|---|---|
| 254921 | 2/1988 | European Pat. Off. |
| 293911 | 12/1988 | European Pat. Off. |
| 302497 | 2/1989 | European Pat. Off. |
| 350112 | 1/1990 | European Pat. Off. |
| 350113 | 1/1990 | European Pat. Off. |
| 355915 | 2/1990 | European Pat. Off. |
| 358476 | 3/1990 | European Pat. Off. |
| 359648 | 3/1990 | European Pat. Off. |
| 444740 | 3/1990 | European Pat. Off. |
| 361602 | 4/1990 | European Pat. Off. |
| 378185 | 7/1990 | European Pat. Off. |
| 396172 | 11/1990 | European Pat. Off. |
| 445864 | 9/1991 | European Pat. Off. |
| 285 103 | 12/1990 | Germany. |
| 0198761 | 12/1982 | Japan .................... 528/67 |
| 2146787 | 4/1985 | United Kingdom. |
| 2187566 | 9/1987 | United Kingdom. |

OTHER PUBLICATIONS

Chem Abstracts CA 115(22): 244689r to East German Patent DD285 103, Dec. 5, 1990 to Tschierske.
Chem Abstracts CA 115(6): 61606s for Liq. Cryst 9(6), 821–9; Tschierske; 1991 Jun.
C. Tschierske; "Amphiphilic Propane-1,2 diol derivatives"; Liquid Crystals; vol. 9, Jun., 1991 pp. 821–829.
M. Tanaka et al., "Liquid Crystalline Polyurethanes, 4: Polyurethanes Containing an azobenzene group in The Side Chain", Makromol. Chem. 189, 771–776 (1988).
M. S. Pereira et al., "Frequency Accomodation and Synchronisation in Digital TV Codec", Electronic Letters (Dec. 6, 1990) vol. 26, No., 25, pp. 2104–2105.
W. H. G. Horsthuis et al., "Simple Measuring Method for Electro-Optic Coefficients in Poled Polymer Waveguides", Appl. Phys. Lett. 55(7), Aug. 14, 1989, pp. 616–618.
P. R. Ashley et al., "New Poling Techniques for Electro-Optic Polymer Devices", Integrated Photonics Research 1991, p. 87.
D. J. Williams, "Organic Polymeric and Non–Polymeric Materials with Large Optical Nonlinearities", Angew. Chem. Int. Ed. Engl. 23(1984), 690–703.

*Primary Examiner*—John Kight, III
*Assistant Examiner*—R. Johnson
*Attorney, Agent, or Firm*—Richard P. Fennelly; Louis A. Morris

[57] ABSTRACT

The invention relates to a liquid-crystalline polyurethane having a side chain comprising a mesogenic group, giving a clear polyurethane which does not isomerize under the influence of light. Such liquid-crystalline polyurethanes are highly suited to be used for optical data storage. The invention further relates to infrared-sensitive liquid-crystalline polyurethanes and liquid-crystalline polyurethane compositions, films containing said liquid-crystalline polyurethanes or polyurethane compositions, and a device for optical data storage containing said liquid-crystalline polyurethanes or polyurethane compositions.

14 Claims, No Drawings

LIQUID-CRYSTALLINE POLYURETHANES, COMPOSITIONS OF SAID LIQUID-CRYSTALLINE POLYURETHANES, AND A DEVICE FOR OPTICAL DATA STORAGE COMPRISING A LIQUID-CRYSTALLINE POLYURETHANE

BACKGROUND OF THE INVENTION

The invention relates to a liquid-crystalline side chain polyurethane. Such a polyurethane is known from *Makromol. Chem.*, 189 (1988), 771–776 (Tanaka). This article describes a liquid-crystalline polyurethane containing an azobenzene mesogenic group in the side chain attached to the main chain via a flexible spacer. A drawback is that a medium for optical data storage composed of these polyurethanes is not suitable for diazotype copying—a conventional technique for copying these media—on account of absorption at about 400 nanometers. Another drawback to this mesogenic group is its absorption of light in the visible range. Under the influence of light these liquid-crystalline polyurethanes isomerize, which may hamper the long term stability of the written film. The invention has as an object the elimination of these drawbacks.

SUMMARY OF THE INVENTION

To this end the invention encompasses of a liquid-crystalline polyurethane which comprises in the side chain a mesogenic group satisfying the general formula:

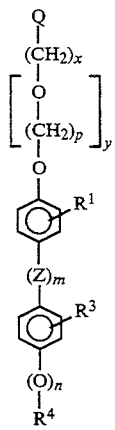

(Formula 1)

wherein
$R^1 =$ —halogen,

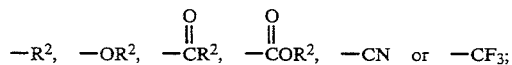

$-R^2$, $-OR^2$, $-CR^2$, $-COR^2$, $-CN$ or $-CF_3$;

$R^2 =$ —H or an alkyl group having 1–3 carbon atoms;
$R^3$ may represent the same groups as $R^1$, but be selected independently of $R^1$;
Q is the monomer radical attaching the mesogenic group to the main chain of the polyurethane;
n is 0 or 1;
m is 0 or 1;
y is an integer from 0 through 3;
p is an integer from 2 through 4;
$R^4 =$ an alkyl group having 1–12 carbon atoms;
x is an integer from 1 through 6; and $Z =$

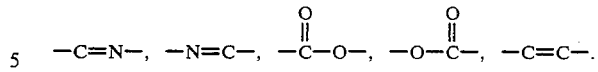

The utilization of these mesogenic groups produces liquid-crystalline polyurethanes highly suited to optical data storage. For instance, the liquid-crystalline polyurethanes according to the invention are clear, which also renders them suitable for diazotype copying, and they isomerize little if at all under the influence of light. Also, the phase transition temperatures, the properties which determine the suitability of liquid-crystalline materials for use in optical data storage, are favorable. The main phase transition temperatures are the glass transition temperature ($T_g$) and the clearing temperature ($T_c$). In the range between $T_g$ and $T_c$ the polymer chains are mobile and the mesogenic groups undergo mutual orientational ordering. The polymer in that case is in the liquid-crystalline phase. A further advantage of the use of the presently proposed mesogenic groups is that, unlike in the case of Tanaka's polyurethanes, there is no need to incorporate a flexible spacer between the mesogenic group and the main chain to obtain liquid-crystalline behavior. In Formula 1 the $(CH_2)_x$-group represents a spacer. If $x=1$ and $y=0$, it is not possible to speak of a flexible spacer; in that case, this description will refer to a short spacer. The use of mesogenic groups according to the invention with a short spacer also produces liquid-crystalline polyurethanes. The term liquid-crystalline side chain polyurethanes in this description refers to polyurethanes having mesogenic groups in the side chains. By mesogenic groups are meant in this connection, groups bringing about the polyurethane's liquid-crystalline behavior.

Other known liquid-crystalline polymers are described in EP-A1-0 350 113 and EP-A1-0 444 740. In these publications liquid-crystalline polyesters are described instead of polyurethanes. Further, EP-A2-0 252 359 and EP-A2-0 293 911 may be mentioned. These publications describe liquid-crystalline polymer networks instead of linear side chain polymers. The latter does not even mention polyurethanes. In EP-A1-0 401 063 polyurethanes which show non-linear optical behavior are described. In this publication it is not mentioned whether said polyurethanes are liquid-crystalline. All the polyurethanes described in the Examples of EP-A1-0 401 063 are diazo compounds having the same drawbacks already mentioned with respect to Tanaka's polyurethanes.

The liquid-crystalline polyurethanes according to the invention can easily be made into films, e.g., by dissolving the polyurethane in a solvent (say, THF) and then applying it to a flexible polymeric carrier to form a 3–8 micrometers thick liquid-crystalline film suitable for optical data storage. Alternatively, it is possible to produce a film made up of more than one layer. The solvent may be removed by heating the formed film for some time. A satisfactory method of obtaining a proper, homogeneously light scattering film is by heating the formed film to above $T_c$ and then leaving it to cool down slowly. This slow cooling process gives the mesogenic groups sufficient time for orientation, the result being a film in which all of the domains are of approximately the same size. The size of these domains is of the order of the wavelength of visible light, and the film is homogeneously light scattering. For instance, a film having a $T_g$ of 98° C. and a $T_c$ of 163° C. is heated to 170° C. and left to cool to 140° C. over a period of 15 minutes. At this temperature the viscosity of the film will by now be high enough to prevent the domains from further fusing together to form large domains, which would render the film transparent. Finally, the film is left to cool to room temperature. In this way a film is obtained in which all of the domains are of approximately the same small size and which is therefore homogeneously light scattering.

Information can be written in such films with a laser. Writing data in liquid-crystalline polymeric compositions is known from various publications. For instance, in EP 0 302 497 a laser is used to write opaque lines in a transparent film. Using a laser the film, which has been aligned in advance with, say, an electric field and so consists of one domain and is hence transparent, is heated locally to cause an alignment disorder to form a light scattering state in the irradiated spot. Alternatively, it is known from other publications to write transparent lines in opaque films. In those cases an unaligned film is employed, which is heated locally with a laser. During laser irradiation an electric or magnetic field is applied, the heated section of the film thus being aligned and so rendered transparent. (cf., e.g., GB-A-2 146 787.)

Yet a further method of writing is employed for the films according to the invention, viz.: a homogeneously light scattering film obtained as described hereinbefore is heated locally with a laser to above its $T_c$, then cooled down rapidly to room temperature. After cooling the locally heated section of the film remains in the isotropic, hence transparent phase: an isotropic glass state has been generated. Since the liquid-crystalline polyurethanes according to the invention have a $T_g$ well above room temperature, the isotropic phase is maintained instead of being converted to thermodynamically more favourable small domains. In this method of writing there is no need for alignment with the aid of an electric or magnetic field.

It is clear from the above that the suitability of the liquid-crystalline polyurethanes for use in optical data storage is determined by the level of the phase transition temperatures. Thus, the $T_g$ has to be above room temperature. Otherwise, written data may be damaged by heating. Furthermore, it is of importance for the $T_c$ not to be too near the decomposition temperature of the polyurethane, for in that case the homogeneously light scattering film would partially decompose as it was being made. Moreover, writing in a film with a high $T_c$ calls for a greater supply of energy. Finally, the difference between $T_g$ and $T_c$ must not be too great, because then the written data will not be frozen sufficiently quickly: the mesogenic groups will remain mobile too long during cooling and will be able to rearrange themselves. Of course, there must be sufficient difference between $T_g$ and $T_c$ to permit a proper, homogeneously light scattering film to be made. Rough guidelines only can be provided here as to the $T_g$ and the $T_c$ and the difference between the two, given that factors such as the film's viscosity and cooling rate are also of importance. However, in actual practice it is easy enough to take these factors into account. As a rule, the difference between $T_g$ and $T_c$ should be at least 20° C. and not more than 100° C. Also, best suited for use are films having a $T_c$ below 200° C. and a $T_g$ above 40° C.

The preferred laser is a solid-state laser, because it is small in size and relatively inexpensive. Use of a solid-state laser ($\lambda = 750-870$ nanometers) is not possible without the liquid-crystalline polyurethane being rendered infra-red sensitive (i.e., absorbing in the wavelength area $\lambda = 750-870$ nanometers). This can be achieved by mixing or covalently incorporating an infra-red absorbing dye into the polymer. By a polyurethane composition is meant in this description, the polymer with the infra-red dye mixed in. The dye absorbs the laser's optical energy and converts it to thermal energy, so that the film is heated locally as mentioned hereinbefore.

In general, covalent incorporation of the infra-red absorbing dye is preferred over its being mixed in, since with covalent incorporation there is no segregation of the dye and it is quite possible to prepare an optically transparent film in which the dye is homogeneously distributed. Neither does the problem of the dye crystallizing out occur, as it often does when it is mixed in. Because the incorporation of infra-red dye does not have a negative effect on the liquid-crystalline behavior of the polyurethanes according to the present invention, they are eminently suitable for such covalent incorporation.

The invention is also directed to a device for optical data storage containing a solid-state laser and a liquid-crystalline polyurethane or liquid-crystalline polyurethane composition according to the invention.

DETAILED DESCRIPTION OF THE INVENTION

The liquid-crystalline polyurethane is preferably obtained from the polymerization of at least one diisocyanate and a diol containing the above-disclosed mesogenic group. The diisocyanates, the diols, and the optional infra-red dyes will be discussed individually below.

Diisocyanates

Examples of suitable diisocyanates include hexamethylene diisocyanate (HDI), paraphenylene diisocyanate (PPDI), xylene diisocyanate (XYDI), and cyclohexyl diisocyanate (CHDI). Diisocyanate blends can also be used in the polyurethane. The use of both flexible and non-flexible diisocyanates in polyurethanes makes it possible to affect the glass transition temperature. By varying, say, the ratio of HDI to PPDI the glass transition temperature can be set. As is illustrated in Examples 34, 35, 36, 38, and 39, plotting the various Tgs of polyurethanes with different HDI/PPDI ratios against the PPDI percentage in the polyurethane results in a straight line (a calibration line). Using the equation of said line, the optimum HDI/PPDI ratio can be determined to obtain a liquid crystalline polyurethane with a specific Tg. In this way liquid-crystalline polyurethanes having a glass transition temperature ($T_g$) above 60° C. can be obtained. Films having such a high $T_g$ do not require clamping between solid substrates (e.g., glass) to prevent the data written in the polyurethane from being damaged. Such polyurethanes are so-called free-standing polyurethanes.

Diols

Eminently suited are diols which satisfy Formula 2 below:

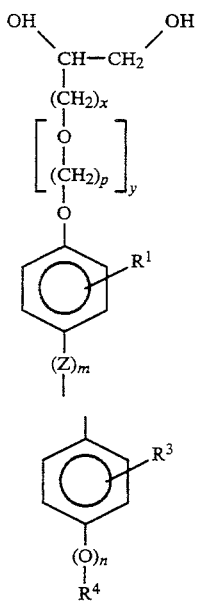

Formula 2 wherein
$R^1 = $ -halogen,

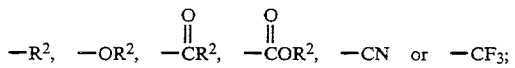

$R^2 = $ —H or an alkyl group having 1-3 carbon atoms;
$R^3$ may represent the same groups as $R_1$, but be selected independently of $R_1$;
n is 0 or 1;
m is 0 or 1;
y is an integer from 0 through 3;
p is an integer from 2 through 4;
$R^4 = $ an alkyl group having 1-12 carbon atoms;
x is an integer from 1 through 6; and
Z =

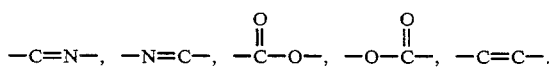

After polymerization they give polyurethanes which can easily be made into clear, homogeneously light scattering films. Diols satisfying the above-mentioned formula will have imino mesogenic, biphenyl mesogenic, stilbene mesogenic or ester mesogenic groups. Imino mesogenic groups having a long chain —O—$R^4$ (or —$R^4$ if n=0) of Formula 2 overall number of C- and O-atoms at least 5) are pre-eminently suited to be used in that they give polyurethanes which can be used in optical data storage. Preference is given to imino mesogenic groups having a chain of at least 7 C- and O-atoms, since they give polyurethanes which can easily be processed into homogeneously light scattering films. In the case of the biphenyl mesogenic diols, properly serviceable liquid-crystalline polyurethanes are generated by short-chain as well as by long-chain diols. Chains having at 1 east three carbon atoms are preferred for their favorable transition temperatures. Especially suitable ester mesogenic diols are those having a long chain (—O—$R^4$ (or —$R^4$ if n=0) of Formula 2).

It is not necessary to attach the mesogenic group to the main chain via a flexible spacer. Of course, a flexible spacer can be employed in the process of making liquid crystalline polyurethanes according to the invention. Alternatively, diol blends may be used. Even blends of diols according to Formula 2 and diols which are not according to the invention are found to result in liquid-crystalline polyurethanes. The incorporation of diols which are not according to the invention may be used to lower the Tc. As is illustrated in Examples 10-14, it is possible to affect the Tc independently of the Tg by using a blend of diols according to Formula 2 having a short chain (—O—$R^4$ (or —$R^4$ if n=0) and diols according to Formula 2 having a long chain. Another method of setting the Tc independently of the Tg is varying the chain length (—O—$R^4$ (or —$R^4$ if n=0) per se. This is illustrated in Examples 15-18 and in Examples 28, 30, 33, 36, and 42.

Dyes

Suitable infra-red absorbing dyes for mixing into the polyurethane should have a sufficiently high coefficient of extinction. This is essential because only a limited amount of dye can be mixed in. When the dye concentration in the polyurethane becomes too high, segregation may occur, and the film will no longer be optically transparent. Given that the mixed in dyes have to be effective in small quantities, a sufficiently high coefficient of extinction is required. Further, the dyes must be readily soluble in the solvent in which the polyurethane film is made. Examples of infra-red absorbing dyes meeting this requirement include infra-red squarilium, croconium, azamethine, and azo dyes. Preferred infra-red absorbing squarilium dyes are the ones given in , pending U.S. Ser. No. 07/764,267, filed Sep. 23, 1991 in Formula III, stripped from their functional groups. Preferred infra-red absorbing croconium dyes are the ones given in Formula IV of pending U.S. Ser. No. 07/764,267, filed Sep. 23, 1991 without the functional groups. Because of their thermal stability to above 200° C., which renders them suitable for use in high $T_c$ liquid crystalline polyurethanes, infra-red squarilium and croconium dyes are preferred, since the film is heated to above $T_c$ as it is made. Azamethine dyes decompose at about 130° C. Consequently, they can be used only in liquid crystalline polyurethanes with a low $T_c$.

Infra-red absorbing dyes which can be covalently incorporated are the ones which are sufficiently stable under the polymerization conditions. Also, they must be fully incorporated, i.e., no free dye may be left in the polyurethane. Of course, the dyes must be functionalized: they must be co-polymerizable with diisocyanate or diols and so will contain, say, two polymerizable OH-groups. Among the dyes satisfying these requirements are OH-functionalized croconium, infra-red squarilium, azamethine, and azo dyes. Also in the case of incorporated dyes the thermal stability is of importance to the applicability. For that reason also the croconium and infra-red squarilium dyes are preferred here. For the formulae of the preferred functionalized squarilium, croconium and azamethine dyes reference is made to EP-A1-0 478 052.

The invention will be further illustrated with reference to some nonlimiting examples below. These examples deal with the preparation of polyurethanes with different mesogenic side groups according to the invention. Also, some polyurethanes with side groups which are outside the scope of the invention are made. All polyurethanes are made into films to check whether it is possible to make a homogeneously light scattering film. The polyurethanes are also examined for a display of liquid crystalline behavior (in that case they will have a $T_g$ as well as a $T_c$). As has been set out hereinbefore, with reference to $T_g$ and $T_c$ suitability for use in optical data storage can be determined.

EXAMPLES

General method of polymerization 10 mmoles of diisocyanate (or a blend of a diisocyanates) were added to 10 mmoles of a mesogenic diol monomer (or a blend of diol monomers according to the invention or a blend of diol monomer(s) according to the invention and diol monomer(s) not according to the invention) in 20 ml of dry DMF. The mixture was stirred for 30 minutes at room temperature under a nitrogen atmosphere. Next, 15 μl of a 2% solution of dibutyl tin diacetate in DMF were added. After 30 minutes the temperature was slowly increased to 70° C., and the reaction mixture was stirred for 20 hours. After cooling down to room temperature the reaction mixture was diluted with 10 ml of DMF and filtered. The clear solution was precipitated in 300 ml of ethanol. The precipitated polymer was filtered off, washed twice using 100 ml of ethanol each time, and dried. A typical yield amounted to 85–95%.

Polyurethanes with imino mesogenic groups (EXAMPLES 1–22)

Two different types of imino mesogenic diol monomers were prepared according to the formula below:

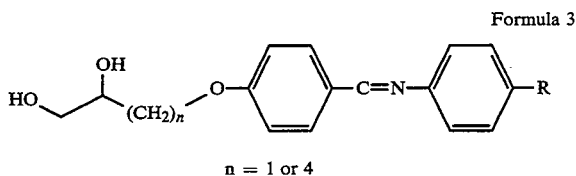

Formula 3 n = 1 or 4 wherein R has the meaning of the groups listed in TABLE I. The first type of iminomesogenic monomer has a short spacer (1 CH$_2$-group). The second type has a long spacer (4 CH$_2$-groups). In TABLE I below this is indicated with K (=short) and L (=long).

Diagram 1 shows the reaction scheme of the synthesis of the diol monomers used to prepare the polymers of Examples 1–22 in TABLE I.

Synthesis of the monomers: (cf. diagram 1)

Reaction 1a: Synthesis of solketal mesylate

To a solution of 150 ml of solketal (1.21 moles) and 250 ml of triethylamine (1.80 moles) in 500 ml of dichloromethane were added, at 0° C. under nitrogen over a period of 90 minutes, 90 ml (1.16 moles) of methanesulfonyl chloride dissolved in 100 ml of dichloromethane. The reaction mixture was stirred for 4 hours at room temperature and then filtered off. The filtrate was washed with 300 ml of saturated sodium bicarbonate and with 100 ml of water, and dried with dry magnesium sulfate. Following filtration and evaporation 220 g of a pale brown liquid were obtained. The crude product was used without further purification.

Reaction 1b: Synthesis of 2,2-dimethyl-1,3-dioxolane-4-butanol mesylate

The synthesis was performed in the same way as the synthesis of solketal mesylate (cf. reaction 1, diagram 1). Instead of solketal 2,2-dimethyl-1,3-dioxolane-4-butanol was employed. A typical yield amounted to 96%.

Reaction 2: Synthesis of 4-((2,2-dimethyl-1,3-dioxa-4-cyclopentyl )methyloxy)benzaldehyde 126.0 g (600 mmoles) of solketal mesylate were added, at 20° C. and under nitrogen, to a mixture of 61.0 g (500 mmoles) of hydroxybenzaldehyde, 82.9 g (600 mmoles) of potassium carbonate, and 1 l of dry DMA. The temperature of the reaction mixture was raised to 130° C. over a period of about 60 minutes. The reaction mixture was stirred at 130° C. for 2 hours, then poured into 6 l of ice water. The precipitate was filtered off and washed three times using 200 ml of ice water each time. The precipitate was dissolved in 500 ml of ethyl acetate, the layers were separated, and the organic layer was dried with dry magnesium sulphate, filtered off, and evaporated. The yield was 105.0 g. The resulting liquid crystallized out and was used without further purification in the next reaction step.

The 4-((2,2-dimethyl-1,3-dioxa-4-cyclopentyl)-butyloxy)benzaldehyde was prepared in an analogous fashion making use of 2,2-dimethyl-1,3-dioxolane-4-butanol mesylate.

Reaction 3: Synthesis of 4-(2,3-dihydroxypropyloxy)-benzaldehyde

To 200 g (0.84 moles) of 4((2,2-dimethyl-1,3-dioxa-4-cyclopentyl)methyloxy)benzaldehyde was added a mixture of 150 ml of water and 75 ml of 12N HCl. The reaction mixture was heated at 60° C. for 2 hours. Following cooling it was neutralized with sodium hydroxide. The product was extracted five times using 150 ml of ethylacetate each time. The organic layer was dried with dry magnesium sulfate, filtered off, and evaporated. The resulting orange oil slowly crystallized out and was used without further purification in the next reaction step. The yield was 150 g (90%).

The 4-(2,3-dihydroxyhexyloxy)benzaldehyde was prepared in an analogous fashion making use of 4-((2,2-dimethyl-1,3-dioxa-4-cyclopentyl)butyloxy)benzaldehyde.

Reaction 4: Synthesis of N-((4-(2,3-dihydroxypropyloxy)phenyl)methylene)-4-(hexyloxy)benzene amine A mixture of 19.6 g ( 100 mmoles ) of 4-(2,3-dihydroxypropyloxy)benzaldehyde and 19.3 g (100 mmoles) of 4-hexyloxyaniline in 200 ml of methanol was heated at refluxing temperature for 1 hour and then cooled to room temperature. The precipitated crystals were filtered, washed with methanol, and dried. The yield was 31.5 g (85%).

N-((4-(2,3-dihydroxyhexyloxy)phenyl)methylene)-4-(hexyloxy)benzene was prepared in an analogous fashion making use of 4-(2,3-dihydroxyhexyloxy)benzaldehyde.

The other diol monomers of Examples 1 and 6–8 were prepared in analogous fashion making use of the corresponding anilines. The yields ranged from 80–90%.

These monomers were polymerized with hexane diisocyanate (HDI), paraphenylene diisocyanate (PPDI), xylene diisocyanate (XYDI) and cyclohexyl diisocyanate (CHDI) as specified by the general polymerization procedure described hereinbefore. The glass transition temperature and the clearing temperature ($T_g$ and $T_c$, respectively) and the molecular weight ($M_w$) are also given in TABLE I. The asterisk (*) denotes a comparative example. For $T_g$ two temperatures are given, indicating the temperature range within which the polyurethane passes into the liquid crystalline state.

TABLE I

| Ex | R | spacer | HDI/PPDI mole. % | $T_g$ (°C.) | $T_c$ (°C.) | $M_w$ |
|---|---|---|---|---|---|---|
| 1 | $OC_4H_9$ | K | 50/50 | 95/100 | 135 | |
| 2 | " | K | 0/100 | 123/147 | 162 | |
| 3 | " | L | 50/50 | 67/81 | 96 | 26,500 |
| 4 | $OC_5H_{11}$ | K | 100/0 | 49/60 | 68 | 89,800 |
| 5 | $OC_6H_{13}$ | K | 100/0 | 51/65 | 86 | 23,100 |
| 6 | " | K | 65/35 | 87/100 | 144 | 32,800 |
| 7 | " | K | 50/50 | 98/110 | 163 | 24,000 |
| 8 | " | K | 25/75 | 116/131 | 188 | 26,000 |
| 9 | " | K | 0/100 | 124/141 | 207 | 20,200 |
| 10 | $OC_6H_{13}/OC_4H_9$ 20/80 mole % | K | 65/35 | 70/98 | 111 | |
| 11 | $OC_6H_{13}/OC_4H_9$ 30/70 mole % | K | 65/35 | 78/101 | 117 | |
| 12 | $OC_6H_{13}/OC_4H_9$ 40/60 mole % | K | 65/35 | 84/102 | 125 | 38,200 |
| 13 | $OC_6H_{13}/OC_4H_9$ 50/50 mole % | K | 65/35 | 82/105 | 125 | 53,800 |
| 14 | $OC_6H_{13}/OC_4H_9$ 75/25 mole % | K | 65/35 | 85/101 | 133 | |
| 15 | $OC_7H_{15}$ | K | 100/0 | 51/64 | 104 | |
| 16 | $OC_8H_{17}$ | K | 100/0 | 57/67 | 113 | 23,300 |
| 17 | $OC_{10}H_{21}$ | K | 100/0 | 57/69 | 142 | |
| 18 | $OC_{12}H_{25}$ | K | 100/0 | 58/67 | 161 | 38,700 |
| 19 | $C_6H_{13}$ | K | 100/0 | 44/56 | 68 | 23,700 |
| 20 | $OC_6H_{13}$ | K | CHDI | 100/120 | 210 | |
| 21 | " | K | XYDI | 67/81 | 95 | 6,800 |
| 22* | $N(CH_3)_2$ | K | 100/0 | 80/88 | — | 30,000 |

All liquid crystalline polyurethanes with imino mesogenic groups according to the invention (Examples 1-21) produced clear homogeneously light scattering films. The results in TABLE I show that the glass transition temperatures can be set by varying the HDI/PPDI ratio. Also, it is clear that diols without an alkyl chain (Example 22) according to Formula 2 do not result in polyurethanes of liquid-crystalline behavior. Further, it is clear from Examples 10-14 that the Tc can be set independently of the Tg by varying the long chain/short chain ratio in blends of diols. For instance, when plotting the various Tcs against the percentage of diol with $R=OC_4H_9$ a straight line is obtained in accordance with the equation $Tc=-0.4 X+145$, wherein X denotes the percentage of diol with $R=OC_4H_9$, while the Tg remains nearly unaltered. From Examples 15-18 it can be seen that the Tc can also be set independently of the Tg by varying the chain length of the diol. Of course, the polyurethanes must be comparable, i.e. having the same spacer lengths and the same diisocyanates, and the Polyurethanes' molecular weights should have the plateau value (viz., their Tgs are no longer dependent on the molecular weight).

DIAGRAM 1

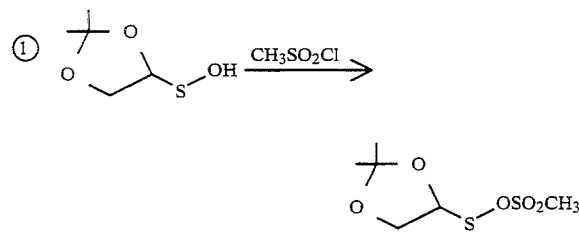

-continued
DIAGRAM 1

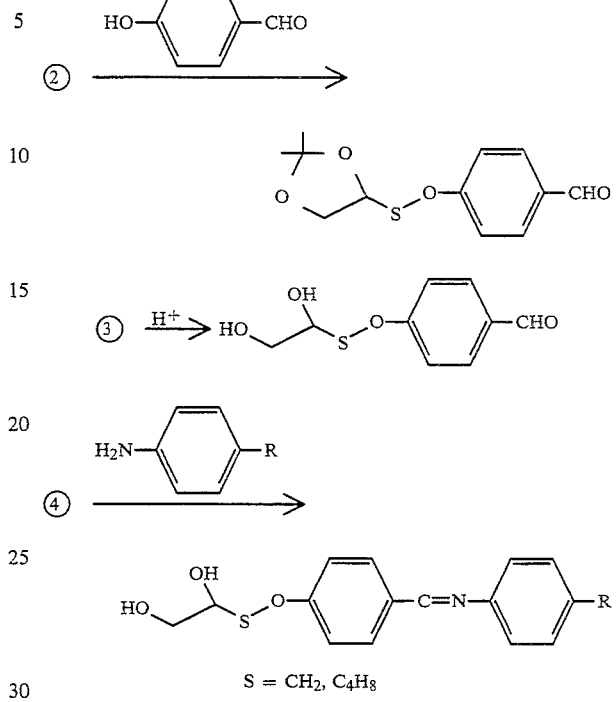

$S = CH_2, C_4H_8$

Polyurethanes with "inverted imino" mesogenic groups (EXAMPLES 23-24)

A number of "inverted imino" mesogenic diol monomers were prepared in accordance with the formula below:

Formula 4

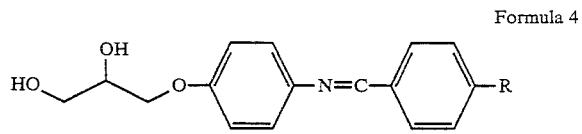

wherein R has the meaning of the groups listed in TABLE II.

Diagram 2 shows the course of the reaction for the synthesis of the diol monomers used to make the polymers in TABLE II.

Synthesis of the monomers: (cf. Diagram 2)

Reaction 1: Synthesis of 4-((2,2-dimethyl-1,3-dioxa-4-cyclopentyl)methyloxy)acetanilide The synthesis was carried out as described for 4-((2,2-dimethyl-1,3-dioxa-4-cyclopentyl)methyloxy)benzaldehyde (cf. diagram 1, reaction 2). Instead of 4-hydroxybenzaldehyde, 4-acetamidophenol was used. A typical yield amounted to 66%, and the melting point was 123-124° C.

Reaction 2: Synthesis of 4-(2,3-dihydroxypropyloxy)aniline

To 30 g (0.11 moles) of 4-((2,2-dimethyl-1,3-dioxa-4-cyclopentyl)methyloxy)acetanilide was added a mixture of 40 ml of water and 40 ml of 12N HCl. Said mixture was heated at refluxing temperature for 1 hour, after which the solution was cooled to 5° C. and neutralized with 20 g of sodium hydroxide. The precipitated product was filtered off, washed with water, and dried;

the product was used without further purification in the next reaction step. The yield was 10.3 g (50%), the melting point 131°–132° C.

Reaction 3: Synthesis of 4-(2,3-dihydroxypropyloxy)-N-((4-(hexyloxy)phenyl)methylene)benzene amine A mixture of 3.7 g (20 mmoles) of 4-(2,3-dihydroxypropyloxy)aniline and 4.1 g (20 mmoles) of 4-hexyloxybenzaldehyde in 100 ml of methanol was heated at refluxing temperature for 1 hour. The mixture was cooled to room temperature, and the precipitated crystals were filtered off, washed with methanol, and dried. The yield was 6.4 g (85%). The other diol monomers were synthesized in the same way by selection of the corresponding aldehydes. The yields ranged from 84 to 96%.

These monomers were polymerized with hexane diisocyanate (HDI) and paraphenylene diisocyanate (PPDI) as specified by the general polymerization procedure described hereinbefore. The glass transition temperature and the clearing temperature ($T_g$ and $T_c$, respectively) and the molecular weight ($M_w$) are also given in TABLE II. The asterisk (*) denotes comparative examples. For $T_g$ two temperatures are given, indicating the temperature range within which the polyurethane passes into the liquid crystalline-state.

TABLE II

| Ex | R | HDI/PPDI mole % | $T_g$ (°C.) | $T_c$ (°C.) | $M_w$ |
|---|---|---|---|---|---|
| 23* | CN | 50/50 | 113/119 | — | 55,400 |
| 24 | OC$_6$H$_{13}$ | 50/50 | 96/109 | 151 | 40,800 |

The table shows that diols having a short spacer (1 CH$_2$-group) and a CN-group as chain do not produce liquid-crystalline polyurethane. Polyurethanes of diols according to the invention (Example 24) were found to display liquid-crystalline behavior and proved readily processable into clear homogeneously light scattering films.

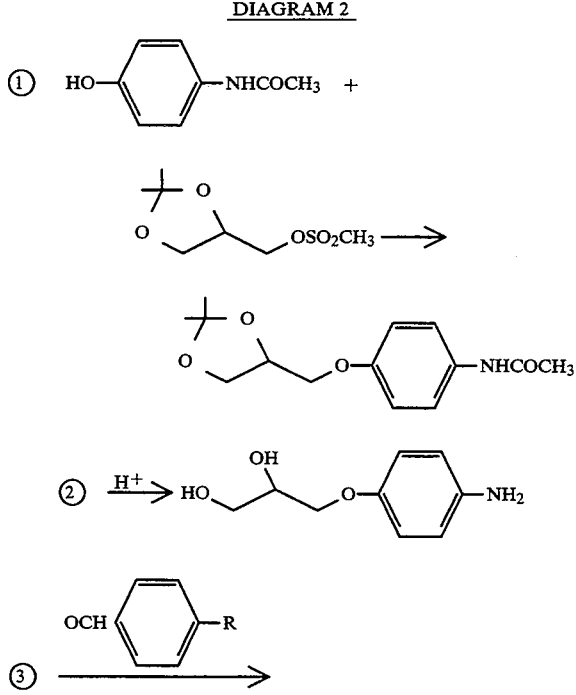

DIAGRAM 2

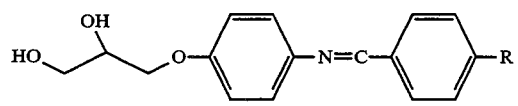

Polyurethanes having biphenyl mesogenic groups (EXAMPLES 25–45)

Two different types of biphenyl mesogenic diol monomers were prepared according to the formula below:

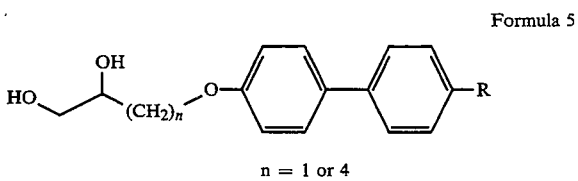

Formula 5 n = 1 or 4 wherein R has the meaning of the groups listed in TABLE III. The first type of biphenyl mesogenic monomer has a short spacer (1 CH$_2$-group). The second type has a long spacer (4 CH$_2$-groups). In TABLE III below this is indicated with K (=short) and L (=long). Diagram 3 shows the reaction scheme for the synthesis of the diol monomers used to prepare the polymers of TABLE III.

Synthesis of the monomers: (cf. Diagram 3)

Reaction 1: Synthesis of 2,2-dimethyl-1,3-dioxolane-4-butanol mesylate

The synthesis was performed in the same way as the synthesis of solketal mesylate (cf. reaction 1, diagram 1). Instead of solketal 2,2-dimethyl-1,3-dioxolane-4-butanol was employed. A typical yield amounted to 96%.

Reaction 2: Synthesis of 4-butyloxy-4'-hydroxybiphenyl (R=OC$_4$H$_9$)

A mixture of 27.9 g (150 mmoles) of biphenol and 7.20 g (180 mmoles) of sodium hydroxide in 150 ml of methanol was heated at refluxing temperature for 1 hour. At said temperature over a period of 30 minutes 20.6 g (0.40 moles) of 4-bromobutane were added, and the reaction mixture was kept at refluxing temperature for 19 hours before being cooled down to room temperature. The precipitate was filtered off, kept at refluxing temperature for 1 hour in a solution of 6 g of potassium hydroxide in 150 ml of methanol. The mixture was cooled to room temperature and the insoluble dibutyloxybiphenyl filtered off. The clear filtrate was treated with 25 ml of 6N HCl and the precipitated 4-butyloxy-4'-hydroxybiphenyl was filtered, washed with water, and dried. The yield amounted to 12.5 g (34%).

Reaction 3: Synthesis of 4-hexyloxy-4'-hydroxybiphenyl (R=OC$_6$H$_{13}$, long spacer)

A mixture of 74 g (0.40 moles) of bisphenol and 20 g (0.50 moles) of sodium hydroxide in 600 ml of ethanol was kept at refluxing temperature for 1 hour. At said temperature over a period of 1 hour 66 g (0.40 moles) of 6-bromohexane were added, and the reaction mixture was kept at refluxing temperature for 18 hours, after which it was cooled to room temperature and the precipitate filtered. The filtrate was treated with 500 ml of water, and the precipitated 4-hexyloxy-4'-hydroxybiphenyl was filtered off and washed with water. After drying 29 g of product were obtained. A supplementary amount of product was obtained after 3 hours of refluxing the precipitate which was collected from the reaction mixture with 45 g of potassium hydroxide in 600 ml of ethanol. This mixture was cooled down to room temperature and the insoluble dihexyloxybiphenyl filtered off. The clear filtrate was treated with 200 ml of 6N HCl, and the precipitated 4-hexyloxy-4'-hydroxybiphenyl was filtered, washed with water, and dried. The yield was 19 g. The overall yield amounted to 48 g (44%).

Reaction 3: Synthesis of 4-(2,3-dihydroxypropyloxy)4'-hexyloxybiphenyl ($R=OC_6H_{13}$, short spacer)

A mixture of 2.70 g (10 mmoles) of 4-hexyloxy-4'-hydroxybiphenyl, 0.50 g (12 mmoles) of sodium hydroxide, 0.70 g of potassium carbonate, and 2.50 g (12 mmoles) of solketal mesylate in 25 ml of DMA was heated to 130° C. over a period of 30 minutes and stirred for 1 hour. After cooling the reaction mixture was poured into 200 ml of water. The precipitated product was filtered and washed with water. The crude product was refluxed for 1 hour in a mixture of 35 ml of THF and 5 ml of 3N HCl. After cooling 25 ml of water were added, and the product was filtered, washed with water, and dried. The yield was 3.2 g (92%). The other monomers were synthesized in the same manner by selection of the corresponding mesylate and 4-substituted-4'-hydroxybiphenyl. The yields ranged from 78 to 90%.

These monomers were polymerized with hexane diisocyanate (HDI) and para-phenylene diisocyanate (PPDI) as specified by the general polymerization procedure described hereinbefore. The glass transition temperature and the clearing temperature ($T_g$ and $T_c$, respectively) and the molecular weight ($M_w$) are also given in TABLE III. The asterisk (*) denotes comparative examples. For $T_g$ two temperatures are given, indicating the temperature range within which the polyurethane passes into the liquid crystalline state.

films. Further, it was found that diols having a CN-group as chain would not give a liquid-crystalline polyurethane either with a short spacer (1 $CH_2$-group) or a long one (4 $CH_2$-groups). However, using mixtures of diols with a long alkyl chain and diols with a CN-group did give liquid-crystalline polyurethanes (Example 45). Polyurethanes of diols having an $O-R^4$-group according to Formula 2 (Examples 28–44) were found to display liquid-crystalline behavior with short as well as with long spacers. In these cases also it proved possible to set the glass transition temperatures by varying the HDI/PPDI ratio. For instance, when plotting the various Tgs against the PPDI percentage in the polyurethane, a straight line is obtained in accordance with the equation: $Tg=0.9X+60$ wherein X denotes the PPDI percentage. Using this equation the optimum HDI/PPDI ratio can be determined to obtain a polyurethane with a specific Tg. From Examples 28, 30, 33, 36, and 42 it can be seen that the Tc can be set independently of the Tg by varying the chain length of R in the diol. Plotting the Tc against the number of C atoms in R results in a straight line in accordance with the equation $Tc=12X+85$, wherein X denotes the number of C atoms in R. Of course, again it is necessary to have comparable polyurethanes, i.e. having the same mesogenic groups, the same spacer lengths, and polymer: having molecular weights of the plateau value (viz., their Tgs are no longer dependent on the molecular weight).

TABLE III

| Ex | R | spacer | HDI/PPDI (mole %) | $T_g$ (°C.) | $T_c$ (°C.) | $M_w$ |
|---|---|---|---|---|---|---|
| 25* | CN | K | 100/0 | 75/80 | — | 25,800 |
| 26* | " | K | 50/50 | 112/119 | — | 13,100 |
| 27* | " | L | 50/50 | 79/88 | — | 13,100 |
| 28 | $OC_3H_7$ | K | 50/50 | 96 | 128 | 10,800 |
| 29 | " | L | 50/50 | 80 | 117 | 16,000 |
| 30 | $OC_4H_9$ | K | 50/50 | 102/?[1] | 142 | 11,200 |
| 31 | " | K | 65/35 | 94/106 | 116 | 17,200 |
| 32 | " | L | 50/50 | 71 | 107 | 7,000 |
| 33 | $OC_5H_{11}$ | K | 50/50 | 103/119 | 148 | 15,100 |
| 34 | $OC_6H_{13}$ | K | 100/0 | 52/63 | 83 | 13,100 |
| 35 | " | K | 65/35 | 91/106 | 141 | 18,900 |
| 36 | " | K | 50/50 | 99/117 | 154 | 17,200 |
| 37 | " | L | 50/50 | 86/?[1] | 129 | 17,300 |
| 38 | " | K | 25/75 | 119/132 | 179 | 25,900 |
| 39 | " | K | 0/100 | 143/158 | 195 | 56,100 |
| 40 | $OC_6H_{13}$/$OC_8H_{17}$ 80/20 mole % | K | 70/30 | 78/103 | 145 | 7,300 |
| 41 | $OC_8H_{17}$ | K | 100/0 | 51/63 | 110 | 9,900 |
| 42 | " | K | 50/50 | 99/113 | 181 | 17,000 |
| 43 | $OC_{12}H_{25}$ | K | 100/0 | 31/44 | 114 | 4,900 |
| 44 | $OCH_3$/$OC_6H_{13}$ 25/75 mole % | K | 25/75 | 119/131 | 153 | 34,000 |
| 45 | $CN$/$OC_6H_{13}$ 25/75 mole % | K | 25/75 | 119/131 | 156 | 14,200 |

[1] the Tg-offset could not be determined

It was found that all the prepared liquid-crystalline polyurethanes having biphenyl mesogenic groups could be turned into clear homogeneously light scattering

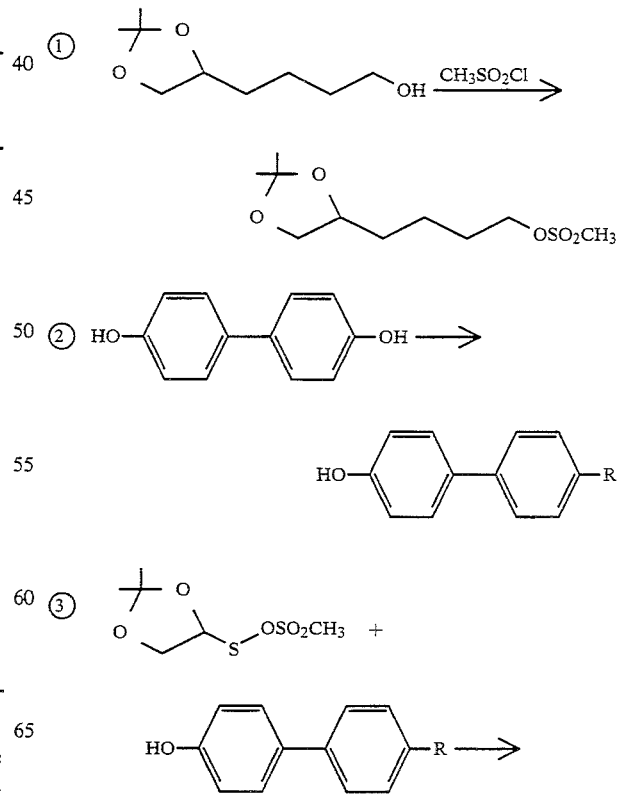

DIAGRAM 3

-continued
DIAGRAM 3

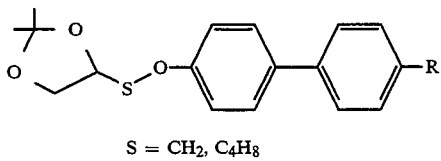

S = CH$_2$, C$_4$H$_8$

Polyurethanes having ester mesogenic groups (Examples 46–52)

Also prepared were phenyl benzoate ester diol monomers according to the formula:

Formula 6

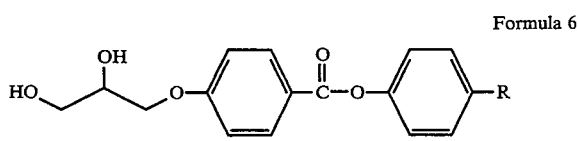

wherein R has the meaning of the groups listed in TABLE IV.

For the synthesis of the monomer of Example 46 the reaction scheme is given in Diagram 4a, for the synthesis of the monomers of Examples 47 and 49–52 it is given in Diagram 4b, and for the synthesis of the monomer of Example 48 and it is given in Diagram 4c.

Synthesis of the monomers

Synthesis of the monomer of Example 46 (cf. Diagram 4a)

Reaction 1: Synthesis of methyl 4-((2,2-dimethyl-1,3-dioxa-4-cyclopentyl)methoxy)benzoate The synthesis was carried out in the same way as described for 4-((2,2-dimethyl-1,3-dioxa-4-cyctopentyl)methoxy)benzaldehyde (cf. reaction 2, Diagram 1). The yield amounted to 86%, and the melting point was 44°–49° C.

Reaction 2: Synthesis of 4-((2,2-dimethyl-1,3-dioxa-4-cyclopentyl)methyloxy)benzoic acid 13.3 g (50 mmoles) of methyl 4-((2,2-dimethyl-1,3-dioxa-4-cyclopentyl)methyloxy)benzoate were dissolved in 200 ml of ethanol containing 11.2 g of potassium hydroxide, and refluxed for 2 hours. The reaction mixture was cooled down to room temperature and poured into 250 ml of ice/water and 250 ml of dichloromethane. The mixture was acidified with formic acid, and the organic layer was isolated and twice washed with water. The organic layer was dried with dry magnesium sulfate, filtered, and evaporated. The yield was 11.3 g (90%), the melting point 142°–144° C.

Reaction 3: Synthesis of 4-nitrophenyl 4-((2,2-dimethyl-1,3-dioxa-4-cyclopentyl)methoxy)benzoate 3.2 ml (44 mmoles) of thionyl chloride were added, at 0° C. and over 30 minutes, to 4 ml of pyridine in 20 ml of dichloromethane. The reaction mixture was stirred for 1 hour, after which 10.1 g (40 mmoles) of 4-((2,2-dimethyl-1,3-dioxa-4-cyclopentyl)methyloxy)benzoic acid in 150 ml of dichloromethane were added, and said mixture was stirred at room temperature for 1 hour. Over a period of 30 minutes and at room temperature 5.6 g (40 mmoles) of 4-nitrophenol in 120 ml of dichloromethane were added to the reaction mixture. The reaction mixture was stirred for 16 hours at room temperature and neutralized with a sodium bicarbonate solution. The layers were separated, and the organic layer was dried with dry magnesium sulfate, filtered, and evaporated. The resulting brown liquid crystallized out, and the crystals were washed with 200 ml of methanol. The yield was 11.0 g (74%), and the melting point was 105°–111° C.

Reaction 4: Synthesis of 4-nitrophenyl 4-(2,3-dihydroxypropyloxy)benzoate 9.9 g (27 mmoles) of 4-nitrophenyl 4-((2,2-dimethyl-1,3-dioxa-4-cyclopentyl)methoxy)benzoate were dissolved in 100 ml of methanol, with 10 g of Dowex ® 50 being added. The mixture was refluxed for 2 hours. The Dowex was filtered off and the filtrate evaporated. The residue was dissolved in ethyl acetate, washed with water, sodium bicarbonate solution, and water. The ethyl acetate layer was dried with dry magnesium sulfate, filtered, and evaporated. The crude product was crystallized from 300 ml of toluene and 30 ml of ethyl acetate. The yield was 4.5 g (51%), and the melting point was 101°–105° C.

Synthesis of the monomers of Examples 47 and 49–52 (cf. Diagram 4b)

Reaction 1: Synthesis of 4-octyloxyphenyl 4-hydroxybenzoate and diphenyl 4-hydroxybenzoate The synthesis of 4-octyloxyphenyl 4-hydroxybenzoate and diphenyl 4-hydroxybenzoate was carried out in the same way as described for the synthesis of 4-hexyloxyphenyl 4-hydroxybenzoate (cf. Diagram 4c, reaction 1). The yield was typically 90%.

Reaction 2: Synthesis of 4-octyloxyphenyl 4-((2,2-dimethyl-1,3-dioxa-4-cyclopentyl)methyloxy)benzoate and diphenyl 4-((2,2-dimethyl-1,3-dioxa-4-cyclopentyl)methyloxy)benzoate The synthesis was carried out in the same way as described for the synthesis of 4-((2,2-dimethyl-1,3-dioxa-4-cyclopentyl)methyloxy)benzaldehyde (cf. Diagram 1, reaction 2). The yield was typically 60–76%.

Reaction 3: Synthesis of 4-octyloxyphenyl 4-(2,3-dihydroxypropyloxy)benzoate 64 g of Dowex ® 50 were added to 64 g (0.14 moles) of 4-octyloxyphenyl 4-((2,2-dimethyl-1,3-dioxa-4-cyclopentyl)methyloxy)benzoate dissolved in 500 ml of methanol. The reaction mixture was refluxed for 8 hours. The hot reaction mixture was filtered off, and the Dowex ® 50 was washed with 200 ml of hot methanol. The product crystallised from the filtrate on cooling. The yield was 53 g (91%).

Reaction 3: Synthesis of diphenyl 4-(2,3-dihydroxypropyloxy)benzoate 20 g (50 mmoles) of diphenyl 4-((2,2-dimethyl-1,3-dioxa-4-cyclopentyl)methyloxy)benzoate were suspended in 650 ml of ethanol, with 2 ml of 4N HCl being added. The reaction mixture was kept at refluxing temperature for 2 hours. The product crystallised out on cooling. The product was filtered off and dried. The yield was 17 g (98%).

Synthesis of the monomer of Example 48 (cf. Diagram 4c)

Reaction 1: Synthesis of 4-hexyloxyphenyl-4-hydroxybenzoate

To a solution of 140 g (0.72 moles) of 4-hexyloxyphenol and 66 g (0.48 moles) of 4-hydroxybenzoic acid in 2 l of toluene were added 2.4 g of concentrated sulphuric acid and 1.5 g of boric acid. The water was removed by distillation, and the product crystallized out at room temperature. The product was filtered, washed with hexane, and crystallized from ethanol/water. The yield was 116 g (77%).

Reaction 2: Synthesis of 4-hexyloxyphenyl 4-(2,3-epoxypropyloxy)benzoate

To a solution of 115 g (0.37 moles) of 4-hexyloxyphenyl 4-hydroxybenzoate and 0.75 g benzyltrimethylammonium chloride in 225 ml of epichlorohydrin was added, over a period of 1 hour and at 70° C., a solution of 14 g (0.34 moles) of sodium hydroxide in 75 ml of water. The reaction mixture was stirred for 2 hours at 70° C. After cooling to room temperature 500 ml of dichloromethane were added. The layers were separated, and the organic layer was washed with 50 ml of water and dried with dry magnesium sulfate. The organic layer was evaporated, and the residue was crystallized from methanol and isopropanol. The yield was 68 g (50%).

Reaction 3: Synthesis of 4-hexyloxyphenyl 4-(2,3-dihydroxypropyloxy)benzoate 24 g (65 mmoles) of 4-hexyloxyphenyl 4-(2,3-epoxypropyloxy)benzoate were dissolved in 200 ml of THF, with 30 ml of 20%-perchloric acid solution being added. The reaction mixture was stirred at room temperature for 24 hours and then poured onto ice. The mixture was extracted with dichloromethane. The organic layer was washed with sodium bicarbonate solution and water, and dried with dry magnesium sulfate. The organic layer was evaporated, and the residue was crystallized from toluene and isopropanol. The yield was 17 g (72%).

These monomers were polymerised with hexane diisocyanate (HDI) and para-phenylene diisocyanate (PPDI) as specified by the general polymerization procedure described hereinbefore. The glass transition temperature and the clearing temperature ($T_g$ and $T_c$, respectively) and the molecular weight ($M_w$) are also given in TABLE IV. The asterisk (*) denotes comparative examples. For $T_g$ two temperatures are given, indicating the temperature range within which the polyurethane passes into the liquid crystalline state.

TABLE IV

| Ex | R | HDI/PPDI mole % | $T_g$ (°C.) | $T_c$ (°C.) | $M_w$ |
|---|---|---|---|---|---|
| 46* | NO$_2$ | 100/0 | 46/61 | — | — |
| 47* | C$_6$H$_5$ | 100/0 | 73/81 | — | 10,300 |
| 48 | OC$_6$H$_{13}$ | 50/50 | 72/84 | 108 | 8,300 |
| 49 | OC$_8$H$_{17}$ | 100/0 | 46/51 | 83 | 6,300 |
| 50 | " | 50/50 | 71/93 | 146 | 5,000 |
| 51 | " | 25/75 | 114/129 | 170 | 21,000 |
| 52 | " | 0/100 | 127/139 | 204 | 10,300 |

TABLE IV shows that polyurethanes of diols having nitro groups or phenyl groups as chains are not liquid-crystalline. All polyurethanes having diols according to Formula 2, however, were liquid-crystalline and resulted in a clear homogeneously light scattering film. Moreover, it was found that the transition temperatures could be set by varying the HDI/PPDI ratio.

DIAGRAM 4a

① 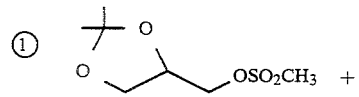

-continued
DIAGRAM 4a

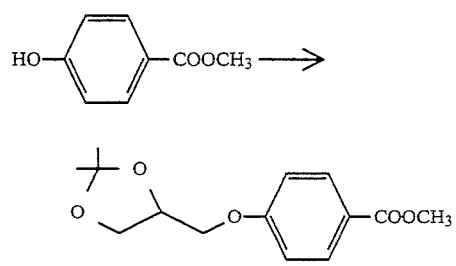

② $\xrightarrow{OH^-}$

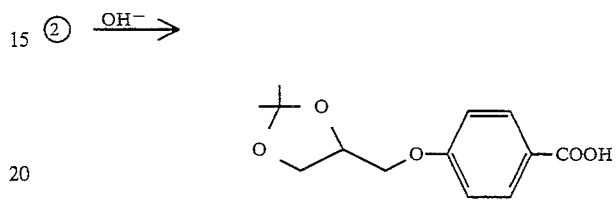

③

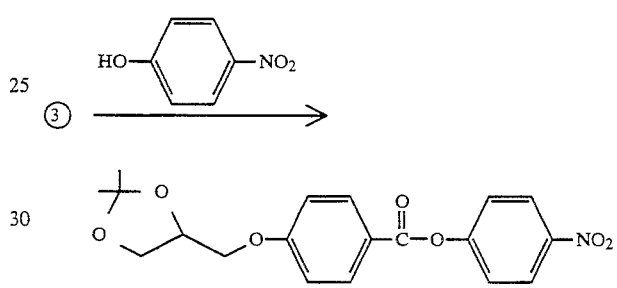

④ $\xrightarrow{H^+}$

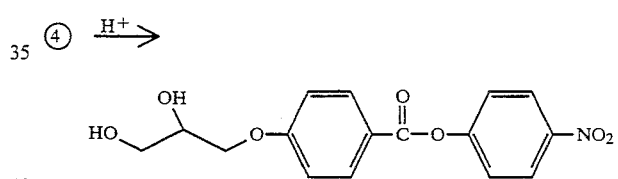

DIAGRAM 4b

① 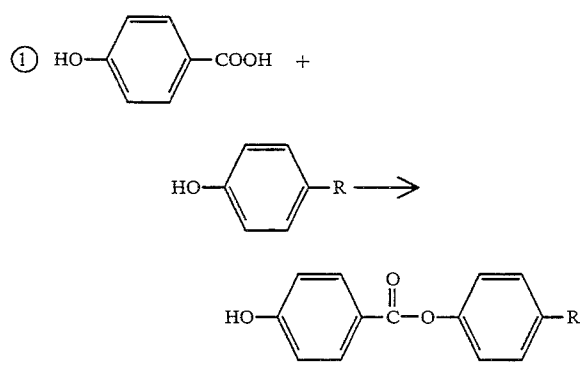

②

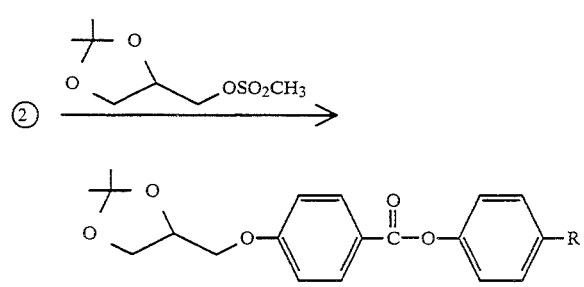

-continued
DIAGRAM 4b

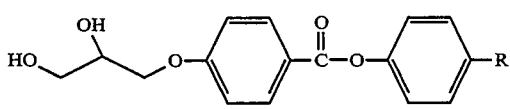

DIAGRAM 4c

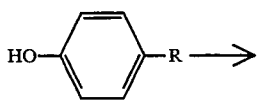

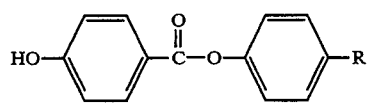

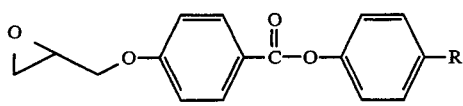

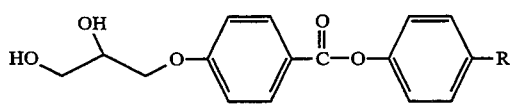

Polyurethanes with covalently incorporated infra-red dye (Example 53)

Incorporated into a polyurethane of imino monomer having $OC_6H_{13}$ as chain and 50% of HDI and 50% of PPDI was about 4 wt. % of squarilium dye of the Formula:

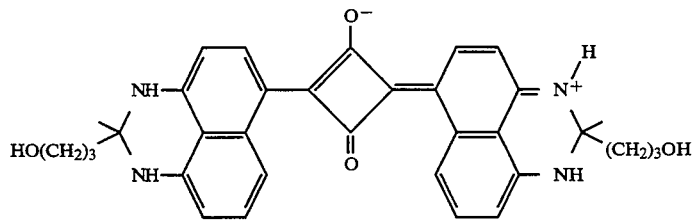

Synthesis of the monomer: cf. reaction 4, Diagram 1:
synthesis of
N-((4-(2,3-dihydroxypropyloxy)phenyl)methylene)-4-(hexyloxy)benzene amine Synthesis of the squarilium dye:

A mixture of 15.8 g (100 mmoles) of 1,8-diaminonaphthalene, 11.2 g (110 mmoles) of 3-acetyl-1-propanol, and 1.0 g of Ambertyst ® 15 ion exchange resin was heated at room temperature for 2 hours. The dark solution was filtered off, and 100 ml of water were added. The precipitated crude product was filtered off, dried, and crystallized from 1 l of toluene. The yield was 17 g (70%).

A mixture of 0.68 g (6.0 mmoles) of squaric acid and 2.91 g (12 mmoles) of the synthesized naphthalene derivative in 90 ml of n-butanol and 30 ml of benzene was heated, with refluxing, in a Dean-Stark trap to remove water. After 90 minutes the mixture was cooled and concentrated under vacuum to 20 ml. 100 ml of ether were added, and the precipitated solid was filtered off. This resulted in 2.2 g of crude product. The dye was purified by means of column chromatography (10% methanol in dichloromethane). The yield amounted to 0.70 g (21%). $\lambda$max: 827 nanometers (in DMSO) and $\epsilon$: 128 000 l.mole$^{-1}$.cm$^{-1}$ (in DMSO) $\lambda$max: 812 nanometers (in THF) and $\epsilon$: 103 000 l.mole$^{-1}$.cm$^{-1}$ (in THF)

Polymerization:

0.62 g (3.69 mmoles) of HDI and 0.59 g (3.69 mmoles) of PPDI were added to 2.63 g (7.07 mmoles) of N-((4-(2,3-dihydroxypropyloxy)phenyl)methylene)-4-(hexyloxy)-benzene amine and 0.16 g (0.28 mmoles) of squarilium dye in 14 ml of dry DMF. The mixture was stirred under nitrogen at room temperature for 30 minutes. Next, 15 $\mu$l of a 2% solution of dibutyltin diacetate in DMF were added. After 60 minutes the temperature was slowly increased, and the reaction mixture was stirred at 80° C. for 4 hours and at 100° C. for 5 hours. After cooling to room temperature the reaction mixture was diluted with 5 ml of DMF and filtered off. The clear polymer solution was filtered, washed twice using 50 ml of ethanol each time, and dried. The yield was 2.5 g (63%). UV analysis showed that about 3.6% of dye was covalently incorporated into the polymer ($\lambda$max: 812 nanometers (THF)). The resulting infra-red sensitive polyurethane was liquid crystalline. The film was clear and homogeneously light scattering, and had the following transition temperatures: $T_g$=88/104° C. and $T_c$=150° C.

We claim:

1. A liquid-crystalline side chain polyurethane, wherein the side chain contains a mesogenic group satisfying the general formula:

Formula I

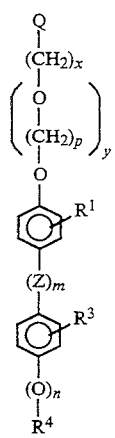

wherein
$R^1$ = -halogen, $-R^2$, $-OR^2$, $-\overset{O}{\overset{\|}{C}}R^2$, $-\overset{O}{\overset{\|}{C}}OR^2$, $-CN$ or $-CF_3$;

$R^2$ = —H or an alkyl group having 1-3 carbon atoms;
$R^3$ may represent the same groups as $R^1$, but be selected independently of $R^1$;
Q is the monomer radical attaching the mesogenic group to the main chain of the polyurethane;
n is 0 or 1;
m is 0 or 1;
Y is an integer from 0 through 3;
p is an integer from 2 through 4;
$R^4$ = an alkyl group having 1-12 carbon atoms;
x is an integer from 0 through 6; and
Z=

$-C=N-$, $-N=C-$, $-\overset{O}{\overset{\|}{C}}-O-$, $-O-\overset{O}{\overset{\|}{C}}-$, $-C=C-$.

2. A liquid-crystalline side chain polyurethane according to claim 1, obtained by polymerization of at least one diisocyanate with at least one diol containing a mesogenic group and satisfying the general formula:

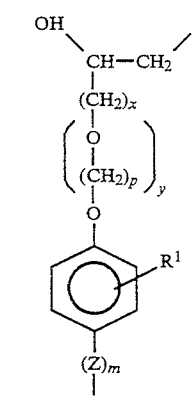

Formula 2

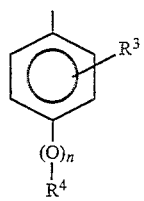

wherein
$R^1$ = -halogen, $-R^2$, $-OR^2$, $-\overset{O}{\overset{\|}{C}}R^2$, $-\overset{O}{\overset{\|}{C}}OR^2$, $-CN$ or $-CF_3$;

$R^2$ = —H or an alkyl group having 1-3 carbon atoms;
$R^3$ may represent the same groups as $R^1$, but be selected independently of $R^1$;
n is 0 or 1;
m is 0 or 1;
y is an integer from 0 through 3;
p is an integer from 2 through 4;
$R^4$ = an alkyl group having 1-12 carbon atoms;
x is an integer from 0 through 6; and
Z=

$-C=N-$, $-N=C-$, $-\overset{O}{\overset{\|}{C}}-O-$, $-O-\overset{O}{\overset{\|}{C}}-$, $-C=C-$.

3. A liquid-crystalline side chain polyurethane according to claim 2, wherein the diol satisfies the formula:

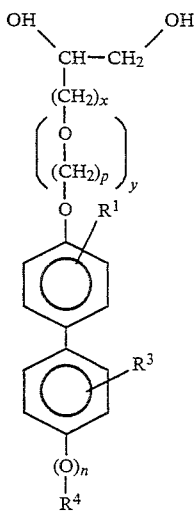

Formula 7 wherein
$R^1$ = -halogen, $-R^2$, $-OR^2$, $-\overset{O}{\overset{\|}{C}}R^2$, $-\overset{O}{\overset{\|}{C}}OR^2$, $-CN$ or $-CF_3$;

$R^2$ = -H or an alkyl group having 1-3 carbon atoms;
$R^3$ may represent the same groups as $R^1$, but be selected independently of $R^1$;
n is 0 or 1;
y is an integer from 0 through 3;

p is an integer from 2 through 4;
R$^4$=an alkyl group having 3–12 carbon atoms; and
x is an integer from 0 through 6.

4. A liquid-crystalline side chain polyurethane according to claim 2, wherein the diol satisfies the formula:

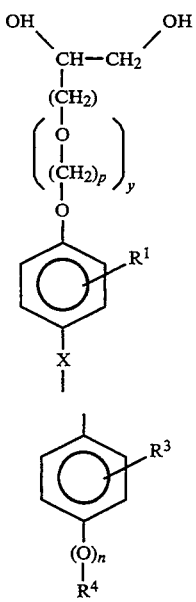

Formula 8 wherein
R$^1$=-halogen,

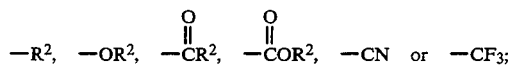

R$^2$=-H or an alkyl group having 1–3 carbon atoms;
R$^3$ may represent the same groups as R$^1$, but be selected independently of R$^1$;
n is 0 or 1;
y is an integer from 0 through 3;
p is an integer from 2 through 4;
R$^4$=an alkyl group having 4–12 carbon atoms if n=1;
R$^4$=an alkyl group having 5–12 carbon atoms if n=0; and
X=—C≡N—, —N≡C—.

5. A liquid-crystalline side chain polyurethane according to claim 2, wherein the diol satisfies the formula:

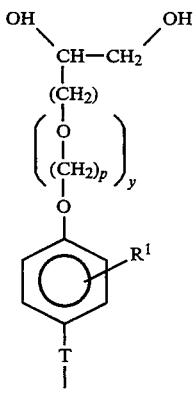

Formula 9

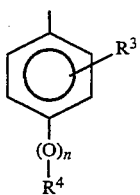

wherein
R$^1$=-halogen,

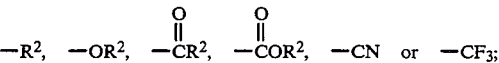

R$^2$=-H or an alkyl group having 1–3 carbon atoms;
R$^3$ may represent the same groups as R$^1$, but be selected independently of R$^1$;
n is 0 or 1;
y is an integer from 0 through 3;
p is an integer from 2 through 4;
R$^4$=an alkyl group having 4–12 carbon atoms if n=1;
R$^4$=an alkyl group having 5–12 carbon atoms if n=0; and
T=

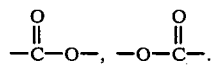

6. A liquid-crystalline side chain polyurethane according to any one of claims 2–5, wherein the diisocyanate comprises hexamethylene diisocyanate, paraphenylene diisocyanate, xylene diisocyanate, cyclohexyl diisocyanate or a mixture of these.

7. A liquid-crystalline polyurethane composition which comprises a polyurethane according to any one of claims 1–5 and an infrared absorbing dye.

8. A liquid-crystalline polyurethane according to any one of claims 1–5 wherein infrared absorbing dye is covalently incorporated into the polyurethane.

9. A liquid-crystalline polyurethane composition according to claim 7, wherein the infrared absorbing dye is a squarilium or a croconium dye.

10. A liquid-crystalline polyurethane according to claim 8, wherein the infrared absorbing dye is a squarilium or croconium dye.

11. A polymeric film comprising a polyurethane or polyurethane composition according to any one of claims 1–5.

12. A device for optical data storage comprising a solid-state laser and a liquid-crystalline storage medium which comprises a liquid-crystalline polyurethane or liquid-crystalline polyurethane composition according to claim 7.

13. A method for adjusting the glass transition temperature of a liquid crystalline polyurethane as claimed in claim 1 wherein a combination of non-flexible and flexible diisocyanates is used in the preparation of said polyurethane and the ratio of non-flexible/flexible diisocyanates is varied.

14. A method for adjusting the clearing temperature of a liquid crystalline polyurethane as claimed in claim 1 wherein a combination of non-flexible and flexible diisocyanates is used in the preparation of said polyurethane and the ratio of non-flexible/flexible diisocyanates is varied.

* * * * *